United States Patent
Kawamura et al.

(10) Patent No.: US 6,620,076 B1
(45) Date of Patent: Sep. 16, 2003

(54) SLIP PREVENTING CONTROL OF TOROIDAL CONTINUOUSLY VARIABLE TRANSMISSION

(75) Inventors: Yasutaka Kawamura, Atsugi (JP); Masaki Watanabe, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/670,823

(22) Filed: Sep. 28, 2000

(30) Foreign Application Priority Data

Sep. 30, 1999 (JP) .......................... 11-278664

(51) Int. Cl.⁷ .......................... B60K 41/04; F16H 59/64
(52) U.S. Cl. .......................... 477/107; 477/98
(58) Field of Search .......................... 477/98, 1.7, 175, 477/181

(56) References Cited

U.S. PATENT DOCUMENTS

| | | | | |
|---|---|---|---|---|
| 4,648,496 A | * | 3/1987 | Petzold | 192/103 R X |
| 4,807,495 A | * | 2/1989 | Wallace | 477/98 |
| 4,964,317 A | * | 10/1990 | Murano et al. | 74/844 |
| 5,115,694 A | * | 5/1992 | Sasaki et al. | 477/98 |
| 5,489,012 A | * | 2/1996 | Buckley et al. | 477/175 X |
| 5,542,890 A | | 8/1996 | Nakano et al. | 476/10 |
| 5,643,132 A | | 7/1997 | Inoue | 476/10 |
| 5,807,206 A | * | 9/1998 | Okazaki | 477/98 |
| 5,876,301 A | * | 3/1999 | Tabata et al. | 477/98 X |
| 5,984,829 A | * | 11/1999 | Minagawa et al. | 477/98 |
| 6,024,668 A | * | 2/2000 | Holbrook et al. | 477/98 |
| 6,088,631 A | * | 7/2000 | Kuehn et al. | 477/98 X |
| 6,106,432 A | * | 8/2000 | Nishida | 477/107 X |
| 6,146,309 A | * | 11/2000 | Nishino et al. | 477/98 |
| 6,223,874 B1 | * | 5/2001 | Wheeler | 477/175 X |
| 6,325,744 B1 | * | 12/2001 | Steib | 477/181 |

FOREIGN PATENT DOCUMENTS

| EP | 0 866 242 | 9/1998 |
|---|---|---|
| EP | 0 916 786 | 5/1999 |

\* cited by examiner

Primary Examiner—Sherry Estremsky
Assistant Examiner—Roger Pang
(74) Attorney, Agent, or Firm—Foley & Lardner

(57) ABSTRACT

A toroidal continuously variable transmission (2) transmits the rotation output of a vehicle engine (1) at an arbitrary speed ratio. The toroidal continuously variable transmission (2) comprises two disks (31, 32) disposed coaxially, and power rollers (33) in contact with the two disk (31, 32). Surface of the two disks (31, 32) and of the power roller (33) are provided with oil. The oil temporarily collected in oil pan (34). The oil temperature in the oil pan (34) is detected by a sensor (14), and slip of the power rollers (33) is prevented by suppressing the output torque of the engine (1) when the oil temperature is low.

18 Claims, 8 Drawing Sheets

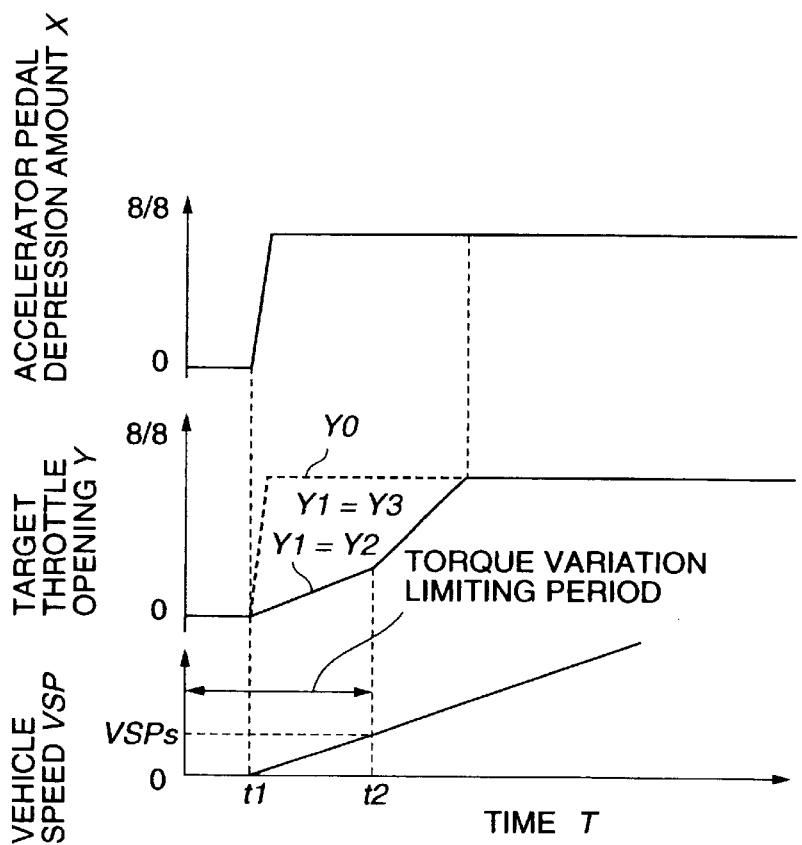
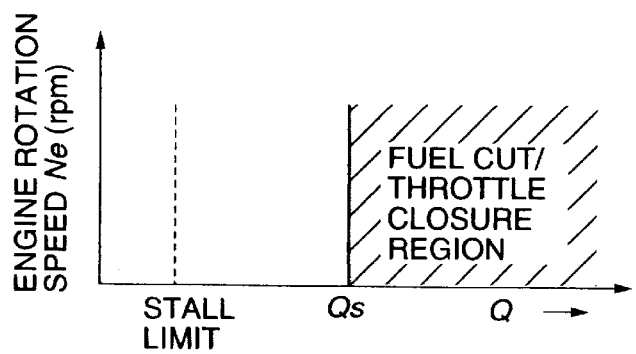
FIG. 11

SLIP PREVENTING CONTROL OF TOROIDAL CONTINUOUSLY VARIABLE TRANSMISSION

FIELD OF THE INVENTION

This invention relates to slip prevention of power rollers of a toroidal continuously variable transmission.

BACKGROUND OF THE INVENTION

U.S. Pat. No. 5,542,890 discloses a toroidal continuously variable transmission for vehicles (referred to hereafter as a toroidal CVT) wherein power rollers are gripped between an input disk and output disk facing each other. In this toroidal CVT, the rotation of the input disk is transmitted to the output disk via the power rollers, and the ratio of the rotation speeds of the input disk and output disk, i.e. the speed ratio of the transmission, varies continuously according to the gyration angle variation of the power rollers. Oil is supplied to the surfaces of these disks and power rollers, and torque is transmitted by the shear drag of the oil between the contact parts of the power rollers and disks.

SUMMARY OF THE INVENTION

In vehicles in which the rotation output of the engine is not input into the toroidal CVT in a neutral range, i.e., vehicles provided with a clutch between the engine and the toroidal CVT, the power rollers and disks do not rotate in the neutral range. Therefore, when vehicles start at low temperature and the selector lever of the vehicles is changed over to a drive range from the neutral range, a torque will act on the low temperature oil. At such low temperatures, the shear drag of the oil is not fully obtained, so immediately after the selector lever is changed over to the drive range from the neutral range, or when the accelerator pedal is depressed to accelerate the vehicle in the drive range, the power rollers may slip. This slip of the power rollers has a undesirable effect on speed ratio control of the transmission.

It is therefore an object of this invention to prevent slip of the power rollers at a low oil temperature.

In order to achieve the above object, this invention provides a slip preventing device of a power roller of a toroidal continuously variable transmission which varies an output rotation of an engine of a vehicle under an arbitrary speed ratio. The transmission comprises two disks disposed coaxially and the power roller is in contact with the two disks. Surfaces of the two disks and the power roller are provided with oil. The device comprises a sensor which detects a temperature of the oil, a mechanism which suppresses an output torque of the engine, and a microprocessor programmed to control the suppressing mechanism to suppress the output torque of the engine when the temperature of the oil is lower than a predetermined temperature.

This invention also provides a slip preventing method of a power roller of a toroidal continuously variable transmission which varies an output rotation of an engine of a vehicle under an arbitrary speed ratio. The transmission comprises two disks disposed coaxially and the power roller is in contact with the two disks. Surfaces of the two disks and the power roller are provided with oil. The method comprising detecting a temperature of the oil, and suppressing an output torque of the engine when the temperature of the oil is lower than a predetermined temperature.

The details as well as other features and advantages of this invention are set forth in the remainder of the specification and are shown in the accompanying drawings.

BRIEF DESCRIPTION OF THE DRAWINGS

FIGS. 10A–10C are timing charts describing the details of torque variation limiting control performed by the control unit.

FIG. 11 is a diagram describing a region of fuel cut/throttle closure with respect to an engine intake amount according to this invention.

DESCRIPTION OF THE PREFERRED EMBODIMENTS

Figure 1:
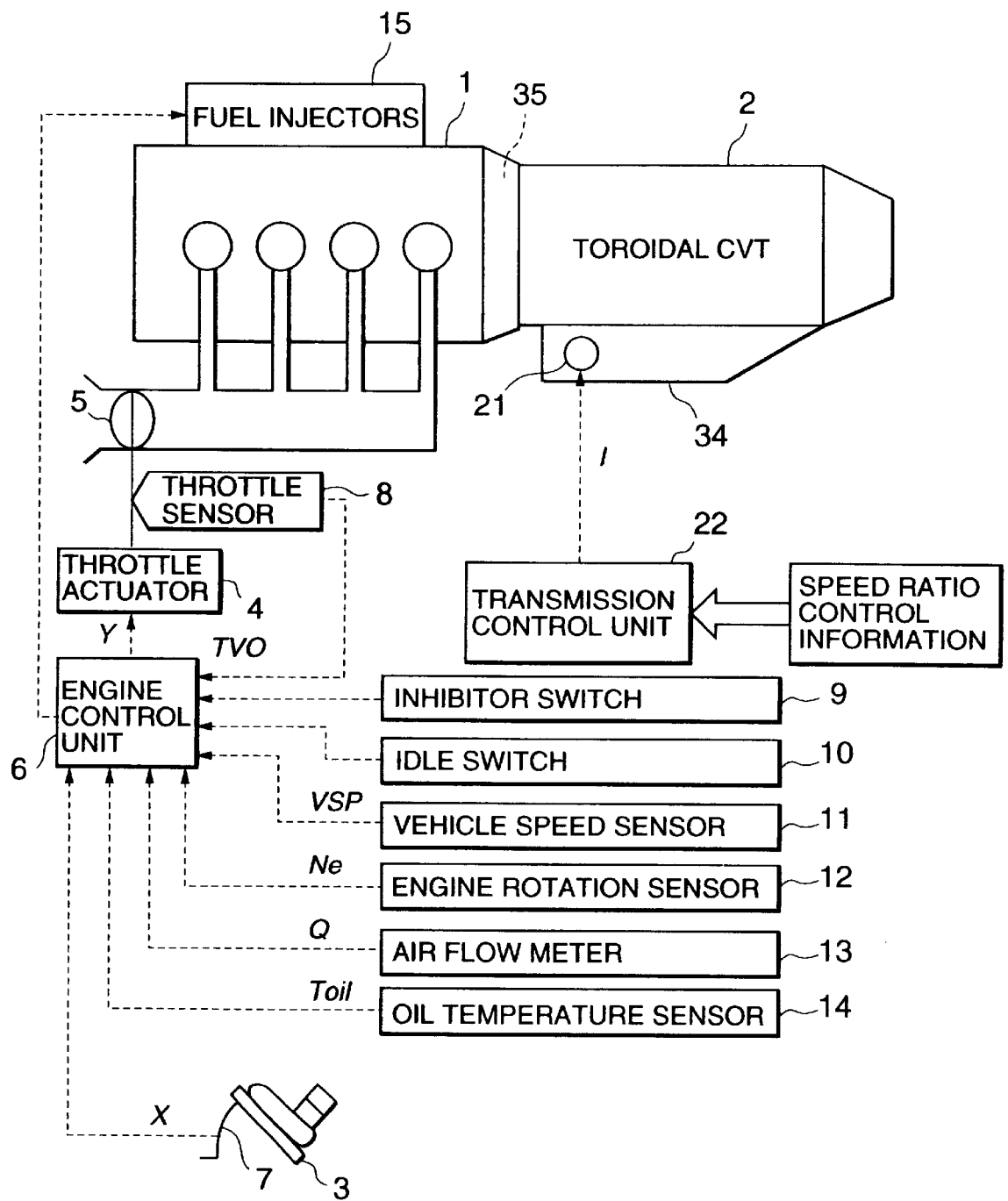
FIG. 1 is the schematic diagram of a slip preventing device toroidal CVT according to this invention.

Referring to FIG. 1 of the drawings, a toroidal continuously variable transmission (referred to hereafter as a toroidal CVT) 2 is joined to an engine 1 of a vehicle by a forward/reverse change-over clutch 35. The toroidal CVT 2 comprises a step motor 21 for speed ratio control so that an output rotation of the engine 1 is transmitted under a desired speed ratio.

Figure 2:
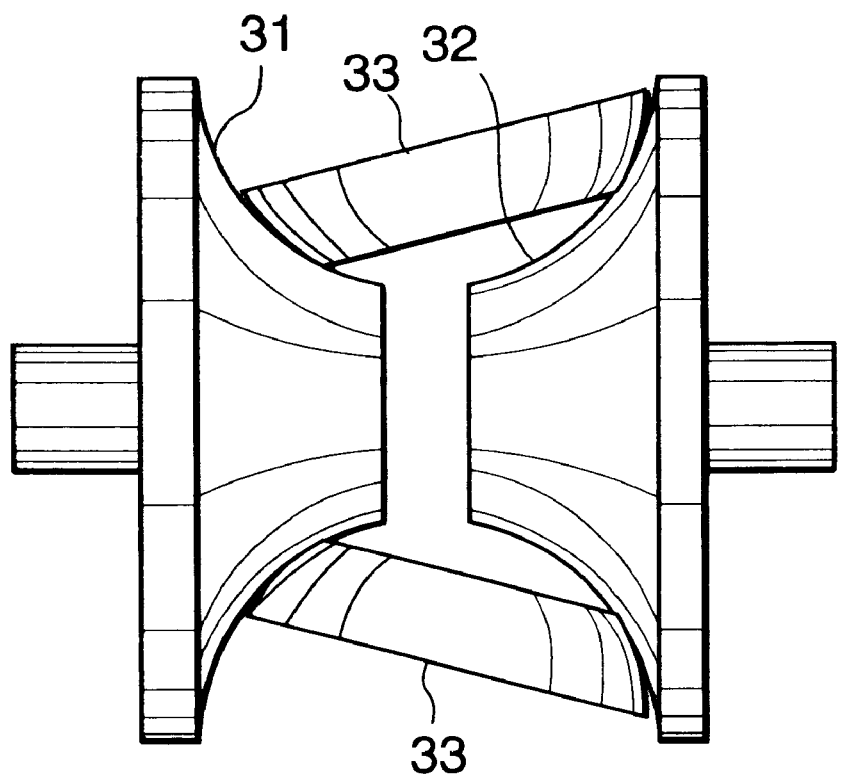
FIG. 2 is a side view of essential parts of the toroidal CVT describing the operating principle of the toroidal CVT.

Referring to FIG. 2, the toroidal CVT 2 comprises an input disk 31 which rotates together with the engine 1, an output disk 32 disposed facing the input disk, and a pair of power rollers 33 gripped between these disks. The rotation of the output disk 32 is transmitted to vehicle drive wheels via various gears. The speed ratio of the toroidal CVT 2 varies according to the gyration angle of the power rollers 33.

The step motor 21 functions as an actuator to vary the gyration angle of the power rollers 33.

Oil is supplied by an oil pump connected to the engine 1 to the surfaces of the input disk 31, output disk 32, and power rollers 33, and the contact parts of these disks 31, 32 and power rollers 33 are permanently provided with this oil. After oil which lubricating these surfaces has temporarily collected in an oil pan 34 disposed under the toroidal CVT 2, it is again supplied to these surfaces from the oil pump.

In other words, oil circulates between the oil pump, the surfaces of the disks 31, 32 and the power rollers 33, and the oil pan 34.

The speed ratio of the toroidal CVT 2 is controlled to a target speed ratio/by a transmission control unit 22 which calculates the target speed ratio/based on various running information which is input, and outputs a corresponding command signal to the step motor 21.

The engine 1 comprises an electric throttle 5 and fuel injectors 15.

The electronic throttle 5 is driven by a throttle actuator 4 to vary an opening surface area of an intake passage of the engine 1. The opening of the electric throttle 5 is controlled to a target throttle opening Y by an engine control unit 6 which outputs a command signal to the throttle actuator 4 based on the target throttle opening Y. A small amount of intake air required for idle running of the engine is allowed to flow even when the electric throttle 5 is fully closed.

The engine control unit 6 comprises a microcomputer comprising a central processing unit (CPU), read-only memory (ROM), random access memory (RAM) and input/output interface (I/O interface).

A signal from an accelerator pedal depression sensor 7 which detects a depression amount of an accelerator pedal 3 operated by a driver of the vehicle is input to the engine control unit 6. The engine control unit 4 basically determines the target throttle opening Y based on an accelerator pedal depression amount X, but the target throttle opening Y is not always made to correspond with the accelerator pedal depression amount X.

When running conditions require, the engine control unit 6 determines the target throttle opening Y based on other specific requirements without depending on the accelerator pedal depression amount X, and controls the electric throttle 5 accordingly.

The engine control unit 6 supplies fuel to the engine 1 via the fuel injectors 15.

When necessary, the engine control unit 6 also prevents slip of the power rollers 33 of the toroidal CVT 2 by suppressing the output torque of the engine 1 to a low level by controlling the electric throttle 5 and fuel injectors 15. The control unit according to this invention therefore corresponds to the engine control unit 6.

To perform this control, signals are input to the engine control unit 6 from various other sensors. These sensors comprise a throttle sensor 8 which detects a real opening of the electronic throttle 5, an inhibitor switch 9 which detects an operation range of the vehicle selected by a selector lever, not shown, with which the vehicle is provided, and idle switch 10 which detects whether the engine is running idle, a vehicle speed sensor 11 which detects a running speed VSP of the vehicle, a rotation speed sensor 12 which detects a rotation speed Ne of the engine 1, an air flow meter 13 which detects an intake flow rate Q of the engine 1, and an oil temperature sensor 14 which detects an oil temperature Toil of oil supplied to the contact surfaces between the power rollers 33 and the disks 31, 32.

Now describing the oil temperature sensor 14, it is difficult to directly detect the temperature of the oil on the surfaces of the power rollers 33 and the disks 31, 32. The temperature of a part which has a correlation with the temperature of the oil on these surfaces is therefore detected. For example, the temperature of the oil pan 34, the temperature in a passage through which the oil flows, or the temperature of one of the disks 31, 32, may be detected.

According to this embodiment, the oil temperature sensor 14 is provided in the oil pan 34, but the oil temperature sensor 14 may be provided in any other position provided its temperature is correlated with the temperature of the oil on the surfaces of the disks 31, 32 and the power rollers 33. The difference between the temperature of the oil on these surfaces and the detected temperature is corrected during numerical setting of a map using the detected temperature.

In this way, the engine control unit 6 controls the engine output to prevent slip of the power rollers 33 based on the temperature detected by the oil temperature sensor 14.

Next, the details of this control performed by the engine control unit 6 will be described referring to FIGS. 3 and 4.

Figure 3:
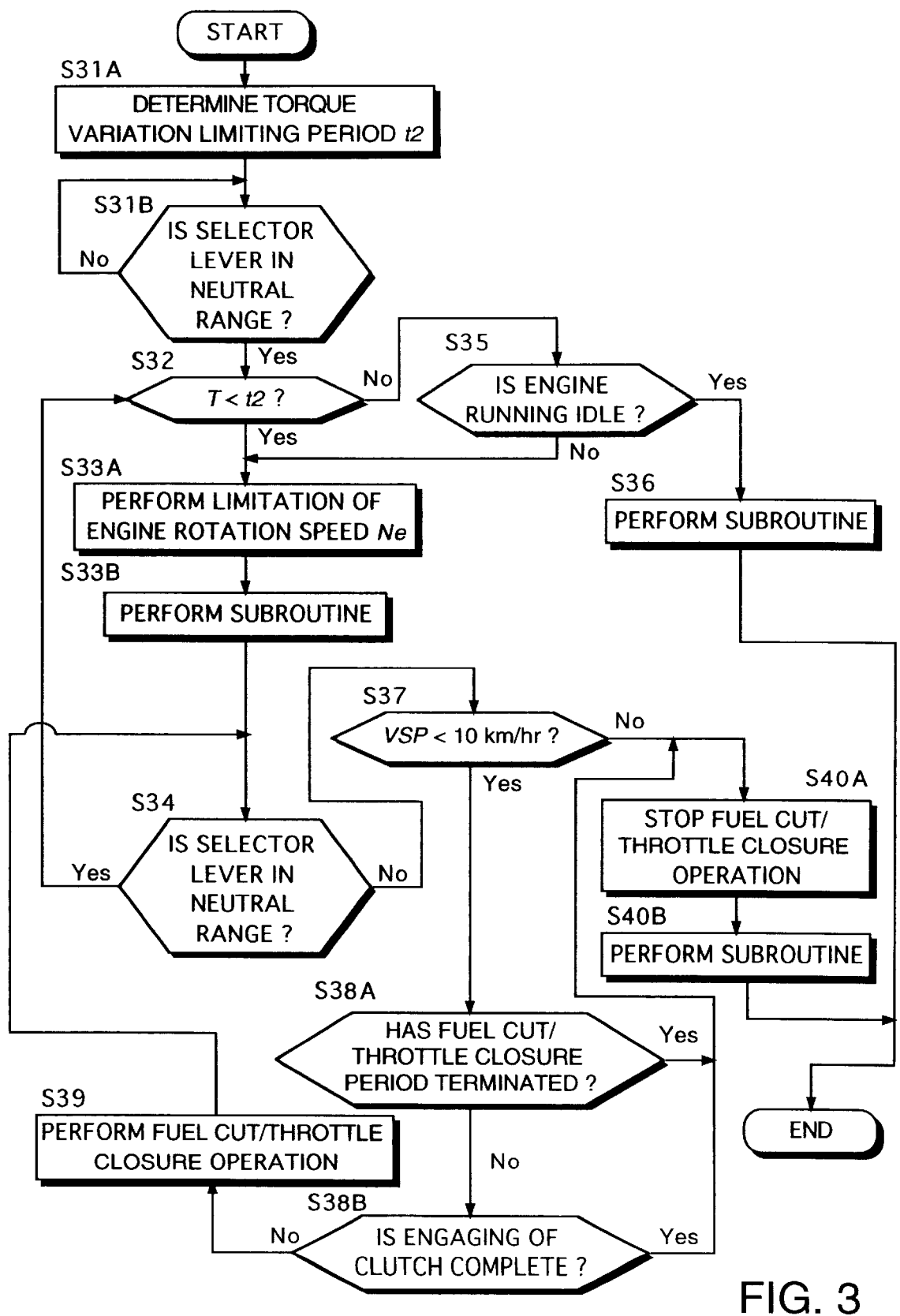
FIG. 3 is a flowchart describing an engine output limiting routine for preventing slip of power rollers performed by a control unit according to this invention.

FIG. 3 shows an engine output control routine for preventing slip. This routine is performed once when the engine 1 starts at low temperature.

Figure 8:
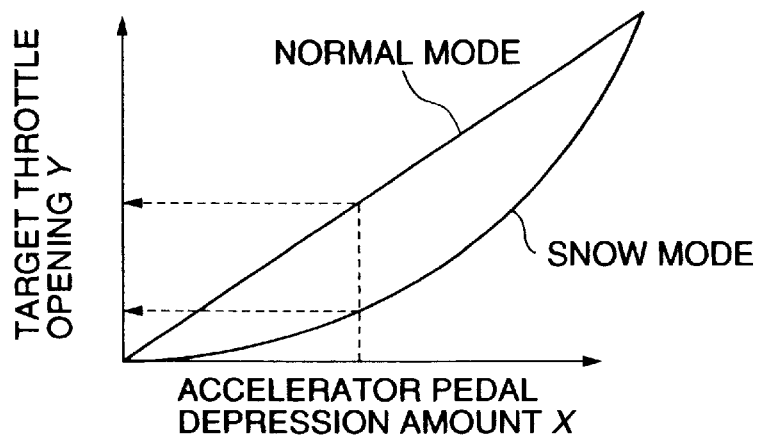
FIG. 8 is a diagram describing the contents of a map specifying a relation between an accelerator pedal depression amount and a target throttle opening stored by the control unit.

When the engine starts at low temperature, the relation between the accelerator pedal depression amount X and target throttle opening Y is not set to the linear, normal mode, but to a snow mode wherein the variation of the target throttle opening Y relative to the accelerator pedal depression amount X is small as shown in FIG. 8.

In this routine, the engine output is also limited by the following three methods. Specifically, an upper limit is given to the rotation speed Ne of the engine 1, a limit is applied to the variation rate of the rotation speed Ne of the engine 1, and fuel cut with closing of the electronic throttle 5 are performed in the engine 1.

Figure 5:
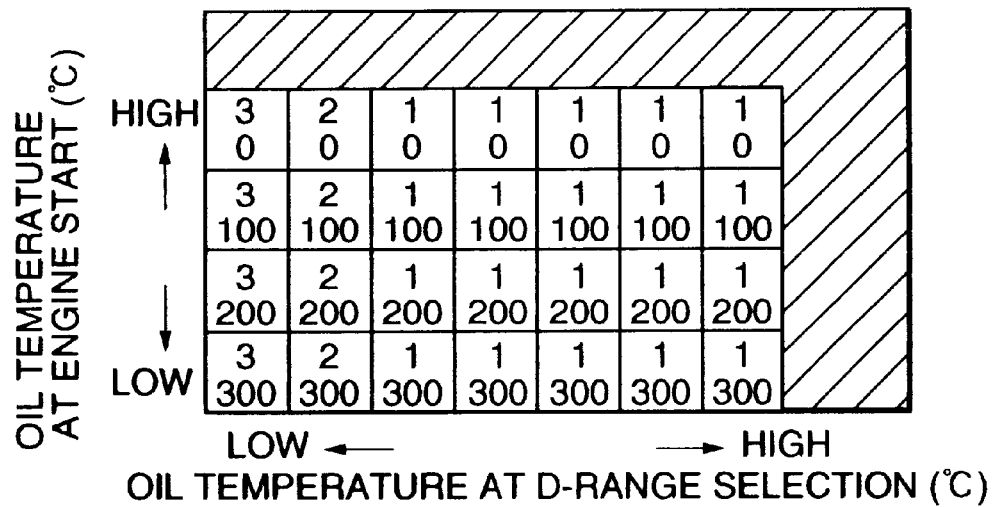
FIG. 5 is a diagram describing the contents of a map of an engine output torque variation limiting period, and a fuel cut/throttle closure period stored in the control unit.

When the engine 1 starts, the routine first determines a torque variation limiting period t2 by looking up a map shown in FIG. 5 based on the temperature detected by the oil temperature sensor 14 in a step S31A.

Here, the map of FIG. 5 will be described. The horizontal axis and vertical axis in the figure both show the temperature in the oil pan 34, but the horizontal axis shows the temperature when the selector lever has changed over the operation range of the vehicle from the neutral range to a running range, and the vertical axis shows the temperature when the engine 1 is starting. In the regions enclosed by rectangular frames in the figure, there is a possibility that the power rollers may slip when the vehicle starts. In the region outside the rectangular frames, there is no possibility that slip will occur.

In these regions the power rollers 33 may slip, so the engine control unit 6 suppresses the engine output to prevent the power rollers 33 from slipping. Of the two rows of numbers in each frame, the lower number shows the torque variation limiting period during which the upper limit of the output torque of the engine 1 is set to be equal to or less than a predetermined value. The torque variation limiting period is set in second units and starts from the starting of the engine 1.

The upper number shows the fuel cut/throttle closure period to prevent slip of the power rollers when the selector lever changes over the operation range from the neutral range to a running range. The fuel cut/throttle closure period is set in second units and starts from the selection of the running range.

Herein, the running range is not limited to a so called drive range, but effectively means all ranges except the neutral range and parking range.

The map shown in FIG. 5 is prestored in the engine control unit 6.

The numbers in the each frame of the map are set as follows.

When the engine 1 starts, an oil pump, not shown, also starts operating, and discharge oil from the oil pump circulates between the power rollers 33, the contact surfaces of the disks 31, 32 and the oil pan 34. In a vehicle provided with a torque converter, oil returned from the torque converter may be supplied to the contact surfaces of the power rollers 33 and disks 31, 32.

Figure 6:
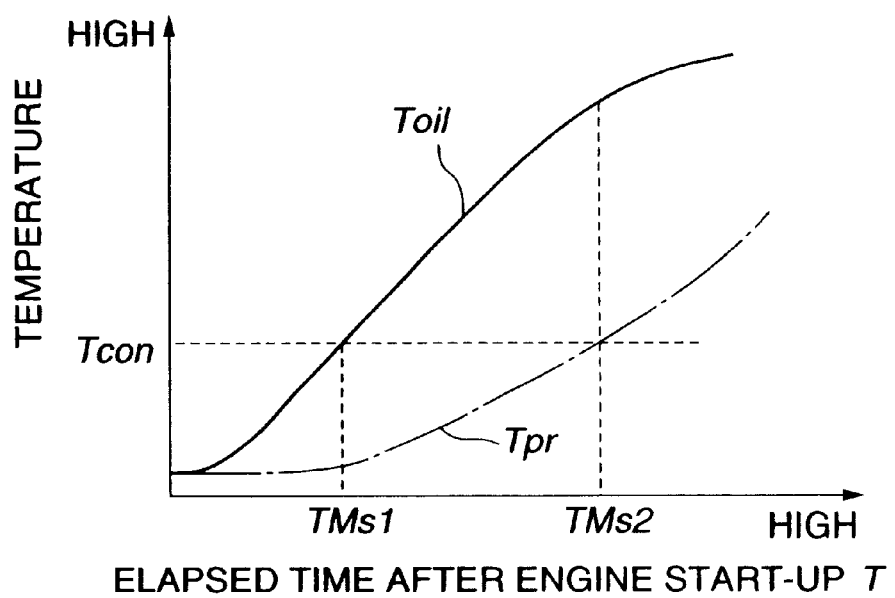
FIG. 6 is a timing chart for describing a relation between an oil temperature of an oil pan and a temperature in a contact part between a power roller and disk after engine startup.

Due to the pressurization of oil, the discharge oil from the oil pump increases in temperature. Due to circulation of this oil between the contact surfaces and the oil pan 34, the oil temperature Toil in the oil pan 34 detected by the oil temperature sensor 14 also increases with an elapsed time T from starting of the engine 1 as shown in FIG. 6 even when the selector lever is in the neutral range and the engine 1 is in the idle running state. In a relatively short time TMs1 after startup of the engine 1, a temperature Tcon is reached at which there is no risk of slip of the power rollers 33.

On the other hand, in the contact surfaces of the power rollers 33 and the disks 31, 32, a temperature Tpr increases more slowly than the oil temperature Toil of the oil pan 34 as shown by the dotted line in the figure due to the large thermal capacity of these parts, and finally reaches the temperature Tcon at a time TMs2. This time TMs2 is later the lower the oil temperature Toil of the oil pan 34 when the engine 1 starts.

Therefore, the torque variation limiting period shown in the lower part of the frames of FIG. 5 is set to be longer the lower the oil temperature of the oil pan 34 when the engine 1 starts.

The operation of fuel cut/closure of the throttle 5 shown in the upper part of the frames of FIG. 5 is performed when there is a change-over from the neutral range to a running range. Therefore, this number is set to be longer the lower the oil temperature of the oil pan 34 when there is a range change-over. In other words, the torque variation limiting period depends on the vertical axis in FIG. 5, and the fuel cut/closure period of the throttle 5 depends on the horizontal axis in FIG. 5.

After setting the torque variation limiting period t2 in the step S31A, the routine determines whether or not the selector lever is in the neutral range in a step S31B based on a signal from the inhibitor switch 9. When the toroidal CVT 2 is not in the neutral range, the routine stands by without performing further steps until the selector lever selects the neutral range.

When the toroidal CVT 2 is in the neutral range, the routine first determines, in a step S32, whether or not the current time is within the torque variation limiting period t2 set in the step S31A. Specifically, the elapsed time T from startup of the engine 1 to the current time is compared with the torque variation limiting period t2, and when the former is less than the latter, it is determined that the torque variation limiting period t2 is in progress. In this case, the routine proceeds to a step S33A.

In the step S33A, processing is performed to limit the rotation speed Ne of the engine 1.

Figure 7:
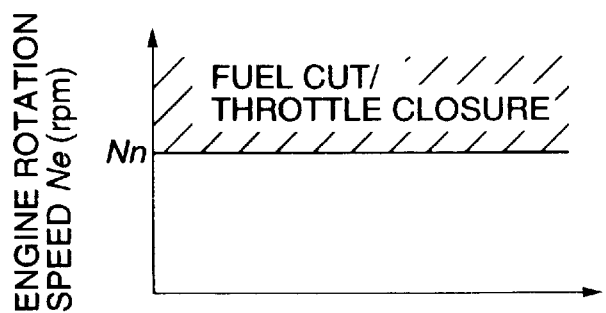
FIG. 7 is a diagram describing a region of fuel cut/throttle closure with respect to an engine rotation speed according to this invention.

This processing will now be described referring to FIG. 7.

In this figure, a region where the engine rotation speed Ne exceeds a predetermined speed Nn is a region in which the power roller 33 may slip when a change-over from the neutral range to a running range is performed while the contact surfaces of the power rollers 33 and the disks 31, 32 are at low temperature. Therefore, when the engine rotation speed Ne exceeds the predetermined speed Nn, the routine prevents further increase of the engine rotation speed Ne by stopping fuel injection via the fuel injectors 15, and closing the electronic throttle 5 via the throttle actuator 14. In other words, the engine rotation speed Ne is suppressed equal to or less than the predetermined speed Nn before the change-over of operation range is performed.

After this processing, the routine performs variation limiting processing of the output torque of the engine 1 in a step S33B. This processing is performed using a subroutine shown in FIG. 4.

Figure 4:
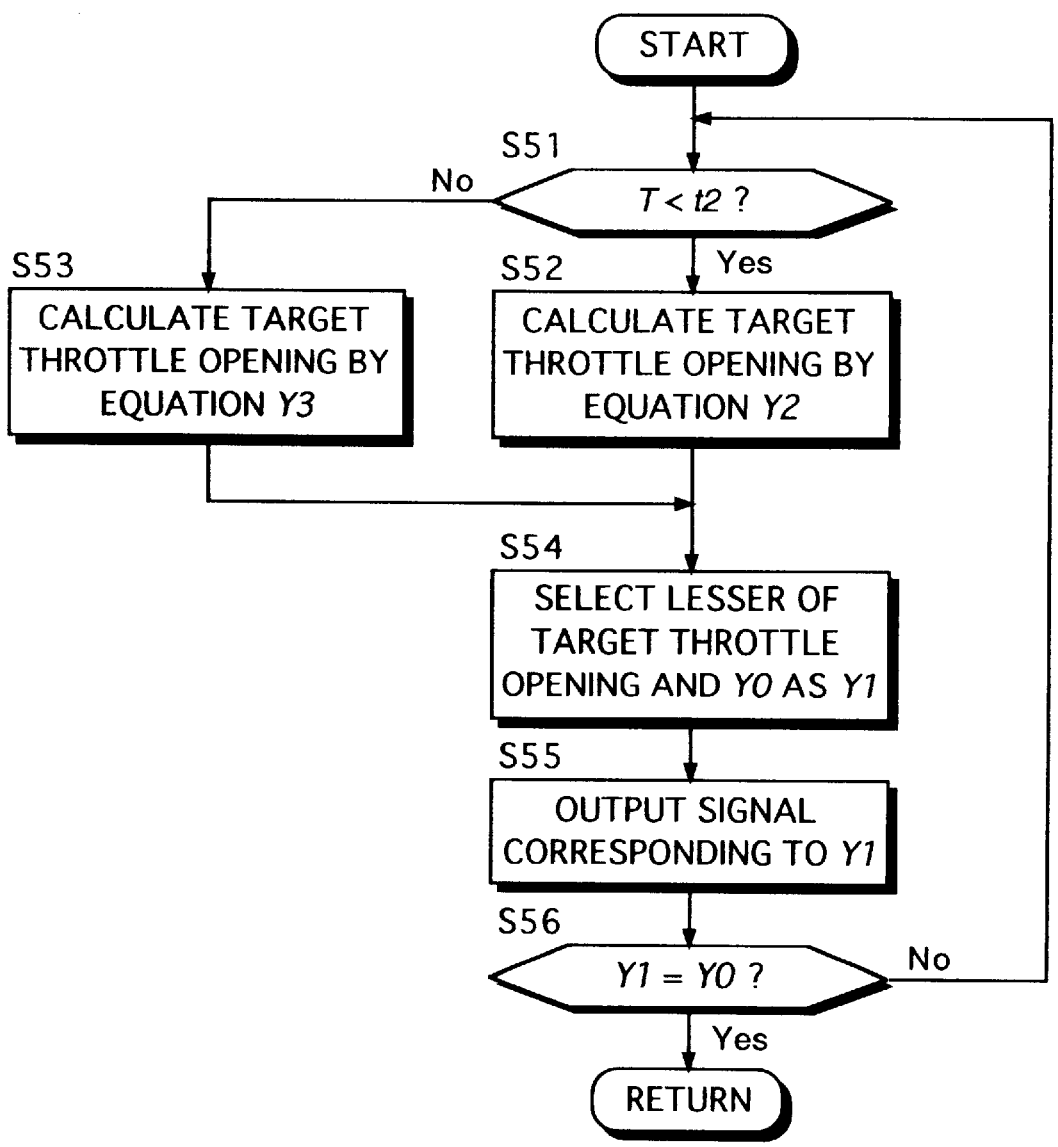
FIG. 4 is a flowchart describing an engine output torque variation limiting subroutine performed by the control unit according to this invention.

Referring to FIG. 4, it is first determined in a step S51 whether or not the current time is within a torque variation limiting period t2 as in the case of the step S32.

If the torque variation limiting period t2 is in progress, the routine proceeds to a step S52, and when the torque variation limiting period t2 has terminated the routine proceeds to a step S53.

In the step S52, the target throttle opening Y is calculated from an equation Y2. In the step S53, the target throttle opening Y is calculated from an equation Y3.

Here, the equations Y2, Y3 will be described referring to FIGS. 10A–10C.

The target throttle opening Y of the electronic throttle 5 is determined based on the accelerator pedal depression amount X as described above. When the accelerator pedal depression amount X varies as shown in FIG. 10A, the target throttle opening Y determined by this method is a value Y0 shown by the broken line in FIG. 10B. However, a sharp torque increase resulting from this may cause the power rollers 33 to slip when the contact surfaces of the power rollers 33 and disks 31, 32 are at low temperature. For this reason, during the torque variation limiting period t2, i.e., during a period from startup of the engine 1 until the elapsed time T reaches the time t2 shown in FIG. 10, the variation of the target throttle opening Y relative to sharp increase of the accelerator pedal depression amount X is limited as shown by Y2 in the figure.

Figure 9:
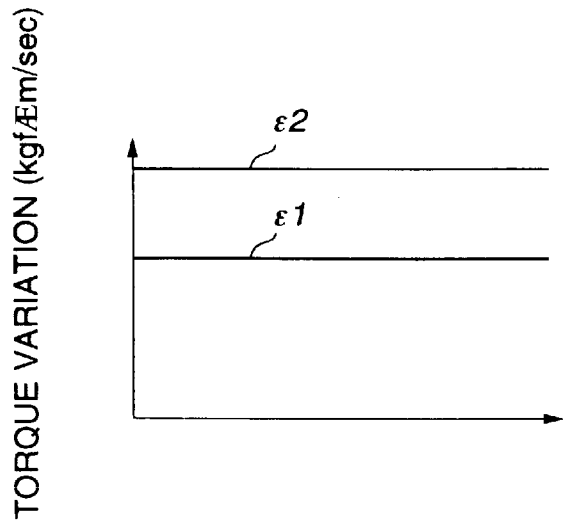
FIG. 9 is a diagram describing a torque slope for a calculation of the target throttle opening performed by the control unit.

Here, Y2 is an expression denoting the product of an elapsed time (T−t1) from a time t1 when depression of the accelerator pedal 3 starts to the current time, and a predetermined variation limiting slope ε1 shown in FIG. 9. In this way, by limiting the rate of increase of the throttle opening Y relative to the depression of the accelerator pedal 3, slip of the power rollers 33 due to sharp increase of torque is prevented. This processing is performed in the step S52.

On the other hand, if the variation limiting periods has terminated i.e., if the elapsed time T exceeds the time t2, the throttle opening Y returns to the original target throttle opening Y0 corresponding to the accelerator pedal depression amount X as shown by Y3 in the figure which is based on an increase rate return slope ε2 larger than the variation limiting slope ε1 shown in FIG. 9. Here, Y3 is an equation using the throttle opening at the time t2 and an elapsed time (T−t2) from the time t2. This processing is performed in the step S53.

In this subroutine, the processing of the step S52 corresponds to output limitation of the engine 1 when the temperature of the oil is low. The step S53 is provided to make fluctuation of the output torque of the engine 1 smooth.

After the processing of the step S52 or step S53, the subroutine proceeds to a step S54.

Here, the target throttle opening calculated in the equations Y2 or Y3 is compared with the original target throttle opening Y0, and the lesser of the two is set to a modified opening Y1. This processing is performed so that the value obtained in the equation Y2 or Y3 does not exceed the original target throttle opening Y0.

In a next step S55, a signal corresponding to the modified opening Y1 is output to the throttle actuator 4.

In a next step S56, it is determined whether or not the modified opening Y1 is equal to the original target throttle opening Y0. Until the modified opening Y1 is equal to Y0, the processing from the step S51 is repeated. When Y1 equals Y0, the subroutine is terminated. In this way, this subroutine suppresses steep variation of the throttle opening due to the depression of the accelerator pedal 3.

Returning now to the routine of FIG. 3, after performing torque variation limiting processing in the step S33B, the routine proceeds to a step S34. Here, it is again determined whether or not the selector lever is in the neutral range. While the selector lever is in the neutral range, the processing of the step S32 and subsequent steps is repeated.

On the other hand, in the step S32, when it is determined that the elapsed time T from startup of the engine 1 to the current time exceeds the variation limiting period obtained from the map of FIG. 5, the routine proceeds to a step S35. The routine proceeds to the step S35 when the variation limiting period is terminated while the selector lever is still in the neutral position.

In the step S35, it is determined whether or not an output signal of an idle switch 10 is ON, i.e., whether or not the engine 1 is running idle. When it is running idle, after performing the subroutine of FIG. 4 in a step S36, the routine is terminated. The routine proceeds to the step S36 only when the variation limiting period has terminated and the engine 1 is running idle. Therefore, in the subroutine which is applied in the step S36, only the processing of the step S53 using the equation Y3 is performed.

When it is determined that the engine is not in the idle running state in the step S35, i.e., the accelerator pedal 3 is depressed, the routine proceeds to steps S33A–S33B. In this case, the elapsed time T after startup of the engine 1 exceeds the time t2 of FIG. 10C, so in the step S33B, the processing of the step S53 of FIG. 4, i.e., the processing using the equation Y3, is performed.

If it is determined in the step S34 that the selector lever is in a running range, the routine proceeds to a step S37.

In the step S37, it is first determined whether or not the vehicle speed VSP is less than 10 km/hr. This determination is based on the following reasoning.

Figure 12:
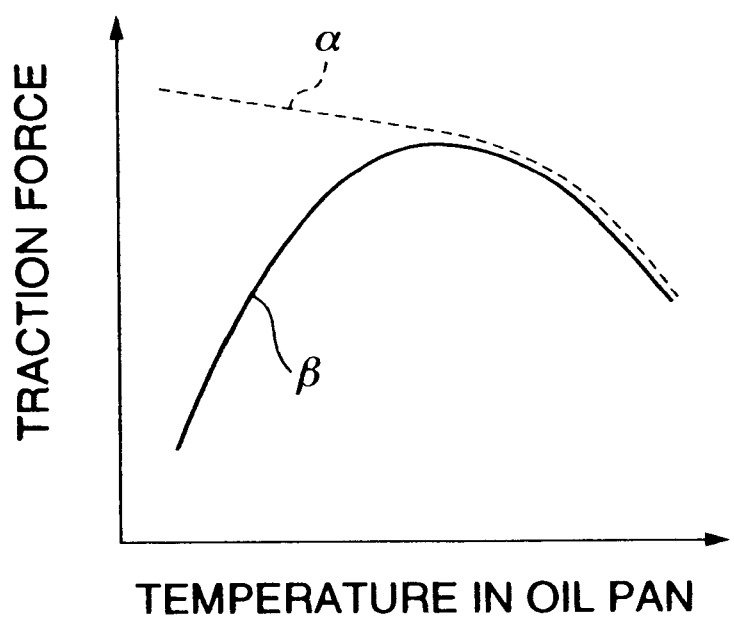
FIG. 12 is a diagram describing a relation between the oil temperature of the oil pan and a traction force of an oil between contact parts.

After experimentally investigating the relation between the traction force of the oil in the contact parts of the power rollers 33 and disks 31, 32, and the oil temperature in the oil pan 34, the inventors obtained the results shown in FIG. 12. Even when the oil temperature in the oil pan 34 is low, when the power rollers 33 are rotating, the oil temperature of the contact parts rises due to friction in the contact parts of the power rollers 33, so sufficient traction force is obtained regardless of the oil temperature in the oil pan 34 as shown by the broken line α in the figure. On the other hand, when the power rollers 33 are almost not rotating or not rotating at all, if the oil temperature in the oil pan 34 is low, the temperature of the contact parts remains low. In this state, if a torque is input to the power rollers 33, a slip may occur between the power rollers 33 and disks 31, 32 due to insufficiency of the traction force of the oil as shown by the solid line β in the figure. The boundary between these two different characteristics was about 10 km/hr when converted to the vehicle speed VSP. In other words, it is evident that, when the vehicle speed VSP exceeds 10 km/hr, the power rollers 33 do not slip.

When the vehicle speed VSP is less than 10 km/hr, the routine proceeds to a step S38A.

In the step S38A, it is determined whether or not an elapsed time from when the selector lever was changed over to a running range exceeds the fuel cut/throttle closure period read from the map of FIG. 5. In other words, it is determined whether or not the fuel cut/throttle closure period has terminated.

When the fuel cut/throttle closure period has not terminated the routine proceeds to a step S38B.

In the step S38B it is determined whether or not engaging of the clutch 35 is complete. This is determined from the variation of the engine rotation speed Ne, when the clutch 35 is engaged, the engine rotation speed Ne first drops, and then recovers to some extent. By identifying this pattern, it is determined whether or not engaging of the clutch 35 is complete. It is preferable to determine that the clutch 35 is engaged when a certain time has elapsed after the engine rotation speed has recovered to some extent.

When engaging of the clutch 35 is not complete, the routine proceeds to a step S39.

In the step S39, fuel cut of the engine 1 and closure of the electronic throttle 5 are performed. This operation is an operation which is performed to decrease the intake flowrate Q of the engine 1 to an intake air amount Qs in a no-load state shown in FIG. 11 to suppress the output torque of the engine 1, and thereby prevent the power rollers 33, which are transmitting torque, from slipping. After this operation, the routine again repeats the processing of the step S34 and subsequent steps.

On the other hand, when the vehicle speed VSP exceeds 10 km/hr in the step S37, the termination of the fuel cut/throttle closure period is determined in the step S38A, or the completion of engaging of the clutch 35 is determined in the step S38B, the routine stops the fuel cut/throttle closure operation in a step S40A, and proceeds to a step S40B.

When the routine proceeds to the step S40B, the aforesaid variation limiting period may or may not have finished. In the former case, in the step S40B, only the processing of the step S53 of FIG. 4 is performed. The latter case is when, for example, the driver changes over the selector lever to a running range immediately after startup of the engine 1, and depresses the accelerator pedal 3. In this case, as the variation limiting period has not terminated the processing of the step S52 is first performed, and the processing of the step S53 is performed after the variation limited period has terminated. Since the torque variation limiting period t2 of the engine 1 is determined based on the oil temperature of the oil pan 34 when the engine 1 starts, and the fuel cut/throttle closure period is determined based on the oil temperature when the selector lever is changed over to a running range, slip of the power rollers 33 is prevented and the output of the engine 1 is suppressed only when really necessary. Therefore, this control has only a slight impact on drivability of the vehicle.

The torque variation limiting period t2 in the description of the above embodiment corresponds to a first period, and the fuel cut/throttle closure operation period corresponds to a second period.

The contents of Tokugan Hei 11-278664, with a filing date of Sep. 30, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the step S39, fuel cut via the fuel injectors 15 and full closure of the electric throttle 15 are performed in parallel to limit the output of the engine 1, but one of these operations may be performed alone.

The embodiments of this invention in which an exclusive property or privilege is claimed are defined as follows.

What is claimed is:

1. A slip preventing device of a power roller of a toroidal continuously variable transmission which varies an output rotation of an engine of a vehicle under an arbitrary speed ratio, the transmission comprising two disks disposed coaxially, the power roller being in contact with the two disks, and surfaces of the two disks and of the power roller being provided with an oil, the device comprising:
    a sensor which detects a temperature of the oil;
    a mechanism which suppresses an output torque of the engine; and
    a microprocessor programmed to:
        control the suppressing mechanism to suppress the output torque of the engine when the temperature of the oil is lower than a predetermined temperature independent of any determination of whether the transmission requires shifting.

2. The slip preventing device as defined in claim 1, wherein the microprocessor is further programmed to suppress the output torque of the engine by performing a limitation of an increase rate of the output torque of the engine.

3. The slip preventing device as defined in claim 1, wherein the microprocessor is further programmed to suppress the output torque of the engine by limiting the rotation speed of the engine.

4. The slip preventing device as defined in claim 1, wherein the microprocessor is further programmed to control the output suppressing mechanism to make the output torque of the engine gradually return to a non-suppressed state after the mechanism has suppressed the output torque of the engine.

5. The slip preventing device as defined in claim 1, wherein the toroidal continuously variable transmission comprises an oil pan for temporarily storing the oil, and the sensor which detects the temperature of the oil comprising a sensor which detects the temperature of oil in the oil pan.

6. The slip preventing device of a power roller of a toroidal continuously variable transmission which varies an output rotation of an engine of a vehicle under an arbitrary speed ratio, the transmission comprising two disks disposed coaxially, the power roller being in contact with the two disks, and surfaces of the two disks and of the power roller being provided with an oil, the device comprising:
    a sensor which detects a temperature of the oil;
    a mechanism which suppresses an output torque of the engine; and
    a microprocessor programmed to:
        control the suppressing mechanism to suppress the output torque of the engine when the temperature of the oil is lower than a predetermined temperature,
    wherein the microprocessor is further programmed to suppress the output torque of the engine by performing a limitation of an increase rate of the output torque of the engine,
    wherein the microprocessor is further programmed to stop the limitation of the increase rate when a first period from a starting of the engine has elapsed, and
    wherein the first period is dependent upon the temperature of the oil.

7. The slip preventing device as defined in claim 6, wherein the microprocessor is further programmed to set the first period to be longer the lower the temperature of the oil detected when the starting of the engine was performed.

8. The slip preventing device of a power roller of a toroidal continuously variable transmission which varies an output rotation of an engine of a vehicle under an arbitrary speed ratio, the transmission comprising two disks disposed coaxially, the power roller being in contact with the two disks, and surfaces of the two disks and of the power roller being provided with an oil, the device comprising:
    a sensor which detects a temperature of the oil;
    a mechanism which suppresses an output torque of the engine; and
    a microprocessor programmed to:
        control the suppressing mechanism to suppress the output torque of the engine when the temperature of the oil is lower than a predetermined temperature,
    wherein the engine is connected to the continuously variable transmission via a clutch, and the microprocessor is further programmed to suppress the output torque of the engine by controlling the output suppressing mechanism to prevent the output torque of the engine from exceeding a predetermined torque for a second period from when an engaging of the clutch is performed after a starting of the engine was performed, and
    wherein the second period is dependent upon the temperature of the oil.

9. The slip preventing device as defined in claim 8, wherein the output suppressing mechanism comprises a throttle which controls an intake amount of the engine, and the microprocessor is further programmed to suppress the output torque of the engine by closing the throttle.

10. The slip preventing device as defined in claim 9, wherein the device further comprises a sensor which detects a vehicle running speed, and the microprocessor is further programmed to terminate closing the throttle when the vehicle running speed is equal to or greater than a predetermined speed.

11. The slip preventing device as defined in claim 9, wherein the device further comprises a sensor which detects an engine rotation speed, and the microprocessor is further programmed to determine whether or not the engaging of the clutch is complete based on a variation of the engine rotation speed, and when the engaging of the clutch is complete, to terminate closing the throttle.

12. The slip preventing device as defined in claim 8, wherein the output suppressing mechanism comprises a fuel injector which supplies fuel to the engine, and the microprocessor is further programmed to suppress the output torque of the engine by setting a fuel injection amount of the fuel injector to zero.

13. The slip preventing device as defined in claim 12, wherein the device further comprises a sensor which detects a vehicle running speed, and the microprocessor is further programmed to terminate setting the fuel injection amount of the fuel injector to zero when the vehicle running speed is equal to or greater than a predetermined speed.

14. The slip preventing device as defined in 12, claim wherein the device further comprises a sensor which detects an engine rotation speed, and the microprocessor is further programmed to determine whether or not the engaging of the clutch is complete based on a variation of the engine rotation speed, and when the engaging of the clutch is complete, to terminate setting the fuel injection amount of the fuel injector to zero.

15. The slip preventing device as defined in claim 8, wherein the microprocessor is further programmed to set the second period to be longer the lower the temperature of the oil when the engaging of the clutch is performed after the starting of the engine was performed.

16. The slip preventing device of a power roller of a toroidal continuously variable transmission which varies an output rotation of an engine of a vehicle under an arbitrary speed ratio, the transmission comprising two disks disposed coaxially, the power roller being in contact with the two disks, and surfaces of the two disks and of the power roller being provided with an oil, the device comprising:

a sensor which detects a temperature of the oil;

a mechanism which suppresses an output torque of the engine; and a microprocessor programmed to:
control the suppressing mechanism to suppress the output torque of the engine when the temperature of the oil is lower than a predetermined temperature, wherein the microprocessor is further programmed to suppress the output torque of the engine by limiting the rotation speed of the engine, and wherein the engine is connected to the toroidal continuously variable transmission via a clutch, and the microprocessor is further programmed to stop limiting the rotation speed of the engine when the clutch is engaged.

17. A slip preventing device of a power roller of a toroidal continuously variable transmission which varies an output rotation of an engine of a vehicle under an arbitrary speed ratio, the transmission comprising two disks disposed coaxially, the power roller being in contact with the two disks, and surfaces of the two disks and of the power roller being provided with an oil, the device comprising:

means for detecting a temperature of the oil;

means for suppressing an output torque of the engine; and means for controlling the suppressing means to suppress the output torque of the engine when the temperature of the oil is lower than a predetermined temperature independent of any determination of whether the transmission requires shifting.

18. A slip preventing method of a power roller of a toroidal continuously variable transmission which varies an output rotation of an engine of a vehicle under an arbitrary speed ratio, the transmission comprising two disks disposed coaxially, the power roller being in contact with the two disks, and surfaces of the two disks and of the power roller being provided with an oil, the method comprising:

detecting a temperature of the oil; and suppressing an output torque of the engine when the temperature of the oil is lower than a predetermined temperature independent of any determination of whether the transmission requires shifting.

* * * * *

UNITED STATES PATENT AND TRADEMARK OFFICE
CERTIFICATE OF CORRECTION

PATENT NO. : 6,620,076 B1
DATED : September 16, 2003
INVENTOR(S) : Kawamura et al.

It is certified that error appears in the above-identified patent and that said Letters Patent is hereby corrected as shown below:

<u>Title page,</u>
Item [*] Notice, delete the phrase "by 0 days" and insert -- by 39 days --

Signed and Sealed this

Twenty-eighth Day of September, 2004

JON W. DUDAS
*Director of the United States Patent and Trademark Office*